Jan. 15, 1935.  H. M. SMITH  1,988,022
PHOTOGRAPHIC APPARATUS
Filed Aug. 29, 1932  2 Sheets-Sheet 2

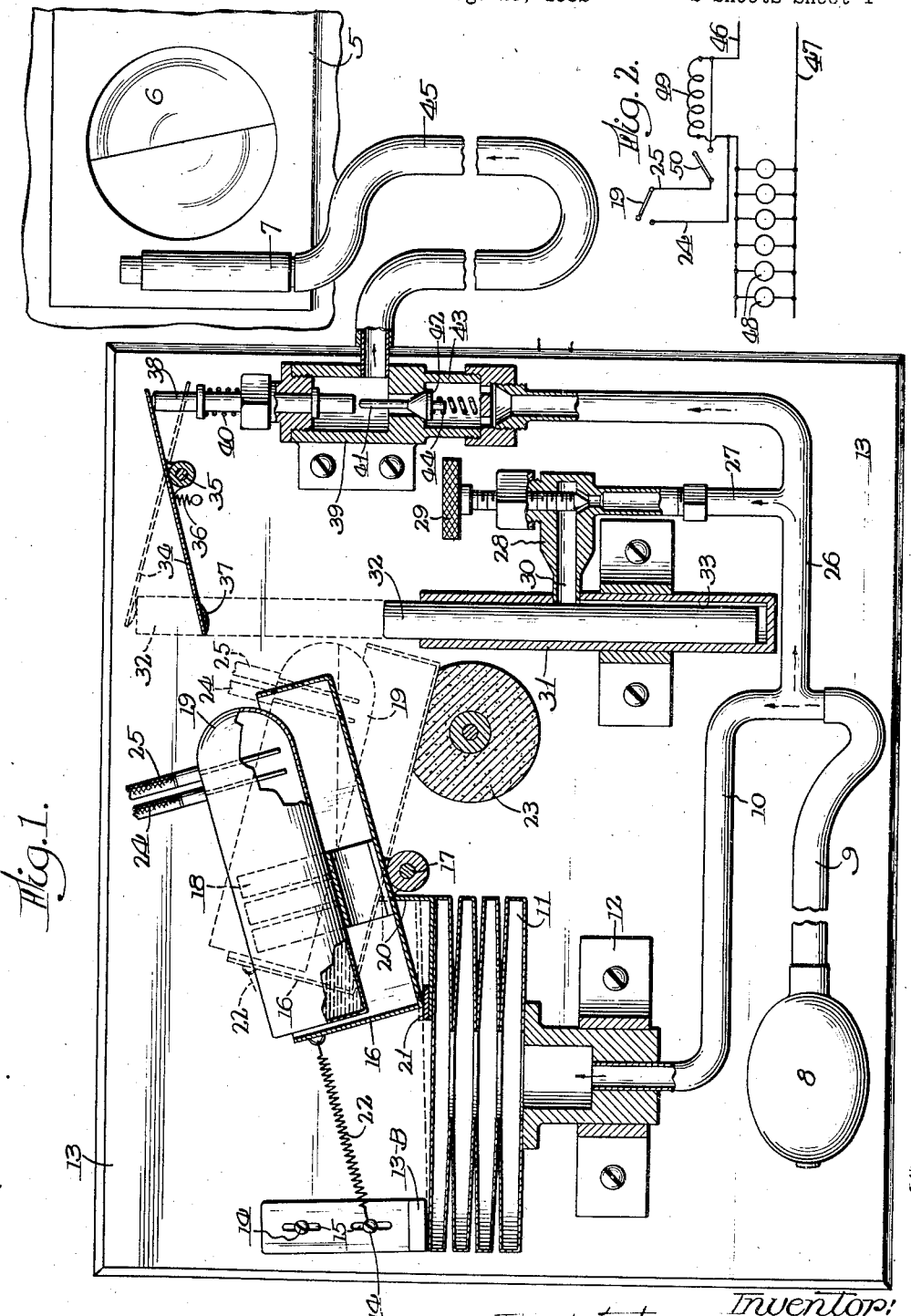
Jan. 15, 1935.  H. M. SMITH  1,988,022
PHOTOGRAPHIC APPARATUS
Filed Aug. 29, 1932  2 Sheets-Sheet 1
Inventor:
Herbert M. Smith
BY: Glenn S. Noble Atty.

INVENTOR.
Herbert M. Smith
BY Glenn S. Noble
ATTORNEY.

Patented Jan. 15, 1935

1,988,022

UNITED STATES PATENT OFFICE 1,988,022

PHOTOGRAPHIC APPARATUS

Herbert M. Smith, Flossmoor, Ill.

Application August 29, 1932, Serial No. 630,828

7 Claims. (Cl. 240—2)

In taking photographs, and particularly portraits, I have found that it is desirable to provide subdued or a minimum amount of illumination for posing the subject, arranging the lights to obtain desired modeling, and for focusing the camera, and then provide a momentarily increased maximum amount of illumination required for taking the picture with an instantaneous shutter action. It is also desirable to create or produce such stepped up illumination a very short interval before the shutter of the camera is operated. In other words, the time factor is extremely important, and to secure good results and to catch desired expressions and poses of the subject, it is necessary to have, first, the step up in illumination, and then the shutter action, follow consecutively and as quickly as possible after the operator squeezes the bulb. The purpose of stepping up the illumination before the shutter is operated is to produce sufficient volume or intensity of light to insure full exposure at instantaneous shutter speed, thus preventing under-exposure or blurring. I have found that it is also desirable to accomplish such stepped up illumination in synchronism with the operation of the shutter and in such a manner that no moving parts are visible and practically no noise is made which would in any way disturb or attract the attention of the subject.

The principal feature of the present invention is the provision of momentarily stepped up light of high intensity in timed relation to the delayed operation of the shutter and preferably the provision of means whereby the stepping up of the illumination and the operation of the shutter will be accomplished by a single, easy movement or action of the operator such as the squeezing and releasing of the bulb commonly used for the operation of a camera.

It is well known that the light from an ordinary incandescent lamp or bulb, which is rated for a given voltage may be greatly increased when such lamp is subjected to a higher or excessive voltage, although the life of the lamp is greatly shortened. For instance, photo flood lamps having a normal rating of sixty-four volts and one hundred watts, will, when subjected to a current of one hundred ten volts, produce an intensely strong light of extremely high photographic value. However, the life of the ordinary lamp of this type when subjected to the higher voltage is reduced to only two to four hours. The disadvantage of using such lamps when burned at this higher voltage during the time required to prepare for and to make an exposure lies in the comparatively short life of the lamps and consequently limited number of exposures which can be made from one or a set of these bulbs. Another disadvantage is the high cost of current due to the greater consumption. Another disadvantage is the unnatural contraction of the pupil of the eye of the subject which results, and still another disadvantage is the unpleasant and disconcerting effect on the subject and the operator by being constantly under this extremely brilliant illumination during the entire sitting. There is also apt to be an added discomfort due to the heat which is generated by a bank of such lamps burning on their higher voltage.

In order to utilize the advantage of the greatly increased illumination obtained when increased voltage is applied to such lamps and avoid such disadvantages, my present apparatus is designed to permit instantaneous exposure with various forms of electric lamps brought up to high brilliancy for a period of only slightly in excess of the exposure period. This is accomplished by synchronizing the shutter action, which is preferably instantaneous, with the earliest point of peak illumination of the lamps which may be used. With electric lamps there is an interval of a fraction of a second after the closure of the contact in the switch applying the current which produces the stepped up illumination before the light reaches the point of full brilliance, so that shutter action must be delayed in relation to closure of this contact if the benefits of the increased illumination are to be secured. This is accomplished in my apparatus. I prefer to provide an adjustable delay for the operation of the shutter so that shutter action may be made to take place at any point between the start of the step up in illumination and the point where maximum illumination is reached. The possibility of making this adjustment is a desirable feature when working with exceptionally active or nervous subjects as the operator might consider less lag—between pressure on bulb and shutter action—of greater importance than securing the full maximum light for the exposure. However, the synchronization of the instantaneous shutter action with the earliest point of peak illumination permits the fullest possible exposure at rapid shutter speeds with the ordinary minimum advisable delay between the electric contact and the shutter action. This reduces to a minimum the possibility of registration on the negative of any change in the subject's expression which might be caused by the disconcerting effect of the early increase or flare-up of the light.

The objects then of the invention are to provide an improved photographic apparatus or method of co-ordinating momentarily stepped up illumination from electric lamps with the operation of a camera shutter in order to produce the desirable effects above suggested, and such other desirable features as will be pointed out hereinafter. Other objects are to provide an improved photographic apparatus whereby in instant response to his touch, light control and operation of the camera shutter are actuated by a single easy movement or operation of the photographer; to provide easy, safe and approved means for closing the switch in conjunction with the delayed operation of the camera shutter by means of a bulb or the like; and to provide such other details in construction as will also appear from the following description taken in connection with the accompanying drawings, in which, Figure 1 is a front view of one embodiment of my apparatus with parts shown in section;

Figure 2 is a diagrammatic view of the lighting wiring system showing the use of resistance to obtain lower voltage for normal burning of the lamps;

Figure 3:
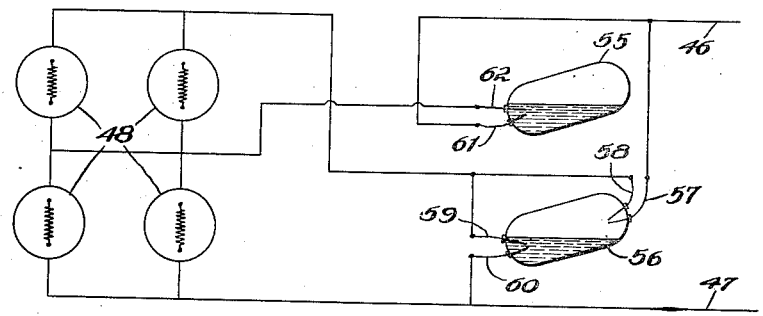
Figure 3 is a diagrammatic view showing one arrangement for shifting from series to parallel wiring for obtaining the low and high voltages.

As shown in Figure 1, 5 indicates a camera having a shutter 6 which is opened and closed by the usual pneumatic operating device 7 actuated by a bulb 8. In order to actuate the illuminating control as well as the shutter, the tube 9 is forked or bifurcated, one branch 10 being utilized for operating the electric switch. This branch leads to a particularly sensitive bellows or pressure control device 11 which is carried on a bracket 12 which may for convenience be mounted on a panel or board 13. The bellows 11 is of circular form and in order to increase the movement one side is adapted to strike or engage with an adjustable stop or abutment 13B which is fastened by screws 14 engaging with slots 15 in the vertical branch of the abutment. A tilting or swinging frame 16 is pivotally mounted at 17 and is provided with a clip or holder 18 for supporting a mercury switch 19. An arm or finger 20 is secured to the bellows or diaphragm 11 on the side opposite from the abutment 13B and engages directly with the bracket 16 at a point adjacent to its pivot. A stop or cushion 21 is also provided on the bellows for receiving the end of the bracket and preventing any noise due to striking or contact with these parts. A spring 22 having one end secured to the bracket and the other end to one of the screws 14 tends to hold the bracket in normal position shown in full lines, with the switch in "off" position. A cushion or buffer 23 is also provided which serves as a stop for the bracket when the switch is moved to closed position as shown in dotted lines. The leads 24 and 25 from the switch contacts connect with the lamp circuit as will presently be described.

The second branch 26 from the tube 9 is utilized for adjustable delayed actuation of the shutter through timed control devices. A branch 27 leads from the branch 26 to a control valve 28 which is preferably of the needle type and which has a thumb piece 29 for actuating the valve member. The outlet 30 from the valve 28 leads to a cylinder 31 having a piston 32 fitting closely therein. The bottom of the cylinder is closed and a passageway 33 is provided for conducting the air from the inlet to the bottom of the cylinder in order to raise the piston. When the piston raises it engages with one end of a lever 34 which is pivoted at 35 and which is held in normal position by a spring 36. A pad 37 is preferably provided to prevent any noise incident to the piston striking the lever.

The opposite end of the lever 34 engages with a sliding pin 38 which is mounted in the upper end of a housing 39 and which is held in normally raised position by a spring 40. The lower end of the pin 38 is adapted to engage with the stem 41 of a valve 42 mounted in a valve body 43, the inlet of which is connected with the tube 26 and the outlet leading into the chamber or housing 39. The valve 41 is normally held in closed position by a spring 44. A tube 45 leads from the housing 39 to the shutter plunger or actuating member 7.

Figure 2 illustrates one form of circuit for accomplishing the purposes above described. Wires 46 and 47 lead from a source of electric supply to one or more lamps 48. A resistance 49 is normally in circuit with the lamps and in the arrangement suggested is adapted to cut down the circuit voltage from one hundred ten volts to sixty-four volts to give the normal or subdued lighting in accordance with the rating of the lamps 48. Of course, such resistance may be increased if more subdued normal lighting is desired. The wires or leads 24 and 25 from the switch 19 are connected with the circuit at the ends of the resistance 49 so that when the switch is closed, a shunt is formed around the resistance and permits the entire voltage of one hundred ten volts to pass directly to the lamps. An additional switch 50 may be provided in this shunt circuit which is manually operated to prevent accidental or unintentional increase in the lighting while the camera is being focused or the subject posed. Or instead of using resistance the lamps may be wired in series to reduce voltage for normal operation and this series wiring broken and parallel wiring momentarily made to supply the maximum voltage.

The operation of the apparatus as a whole, will undoubtedly be readily understood by those familiar with the art. When pressure is first exerted on the bulb 8 it will be noted that the air will first pass through the branch 10 due to the closure of the valve 42 and the restricted passage through the valve 28. This actuates the bellows or diaphragm 11 and causes the arm 20 to press upwardly on the adjacent portion of the bracket 16 and on account of the short leverage, the bracket will be quickly swung to the position shown in dotted lines, thereby closing the switch 19 and permitting the full current to pass to the electric lamps. Shortly after this occurs, the continued pressure of the bulb 8 causes air to pass through the branch 27 to the needle or control valve 28 and into the cylinder 31. This causes the piston 32 to be raised and strike the lever 34 and swing the same to the dotted line position shown. This causes the lever to depress the rod or pin 38 which engages with the valve stem 41 and opens the valve 42. It will be noted that the continued pressure on the bulb causes pressure to be built up in the tube 26 so that when the valve 42 is opened sufficient volume of air will pass quickly to the shutter operating device 7 to insure satisfactory operation of the shutter 6.

The delay or lag in the operation of the shutter in relation to the first pressure on the bulb and the closing of the high voltage circuit which follows, is dependent on the speed of travel of the piston 32. This speed can be regulated by adjusting the needle valve to cover the entire range of adjustment which may be needed to insure the lamps having come up to the point of full brilliancy before the shutter action takes place. This adjustment also permits having the shutter action take place at any point before full brilliancy is reached should it be considered desirable.

When the pressure on the bulb is released a partial vacuum is created in the entire line due to the previous escape of some air through pistons, which vacuum hastens the immediate return of the bellows 11 to normal or collapsed position. The mercury switch also returns to normal position due to the action of the spring 22. The piston 32 returns to normal position on account of the partial vacuum and also under the action of gravity. The lever 34 and the pin 38 also return to normal position and permit the closing of the valve 42 preparatory for the next operation.

With certain types of photographic shutters, the shutter plunger or actuating member 7 must be returned to its down or normal position by the partial vacuum created when the pressure on the bulb is released. This is accomplished by the present mechanism as the suction created when pressure on the bulb 8 is released will draw the air back in the tube 45 through the valve 43, a light spring preferably being used in valve 43 to permit free action in this respect.

It will be readily seen from this description that the arrangement is such that the subject and the operator are under easy, comfortable light except for just slightly more than the instant of exposure—when the lights flare up to their highest brilliancy and immediately drop back to their normal low intensity. The operation is accomplished in the same way that the photographer operates his shutter, by the pressure of the rubber bulb. My improved system is, of course, applicable to all forms of electric lamps.

By means of my apparatus the useful life of the photo flood lamp, or any other electric lamp, is greatly prolonged due to the fact that the greater part of the time they are burned at—or less than—their normal rated voltage and are only flashed on to higher voltage for about one-half second for each exposure made. Actual tests have shown the life of photo flood lamps, when used with my apparatus, to be about thirty thousand exposures, thus making the cost of lighting and current consumption very economical.

A method of switching lamps from series to parallel in order to reduce the voltage is shown in Figure 3. Wires 46 and 47 lead from a source of electric supply to two lamps 48 or any multiple thereof, four of such lamps being shown. Two mercury switches 55 and 56 are mounted on a suitable frame such as the frame 16 in Figure 1. Connecting wires 57, 58, 59, 60, 61 and 62 are connected with the circuit, switches and lamps, as shown, the arrangement being such that when the frame with the switches 55 and 56 thereon is in normal position, the lamps are connected in series, thereby cutting in half the voltage on the filaments. When the frame is tipped or tilted by pressure on the bulb 8, as shown in Figure 1, the switches 55 and 56 open the circuits between the wires 59 and 60 and between the wires 61 and 62 and close the circuit through the wires 57 and 58. This causes the lamps to be connected in parallel and the filaments receive the full line voltage.

Figure 4:
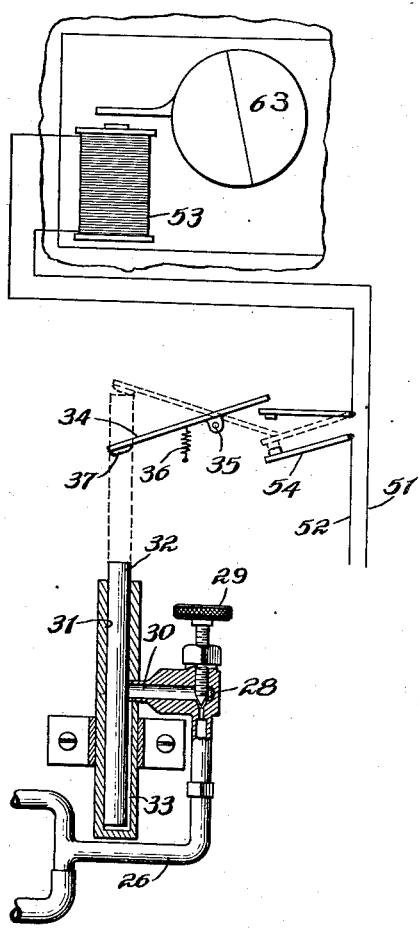
Figure 4 is a front view showing one means of using my apparatus with an electrically operated shutter.

Some standard forms of cameras are provided with electric shutter operating devices such as solenoids and I have shown in Figure 4 a diagrammatic circuit arrangement adapted to be utilized in connection with my apparatus. Wires 51 and 52 lead from any suitable source of current supply to the shutter actuating solenoid or device 53 which is a part of the shutter and its actuating mechanism. A switch 54 is arranged in this circuit to be actuated by the plunger or piston 32. In this arrangement the valve 43 and connections are omitted and when the plunger reaches its uppermost position it closes the switch 54 thus energizing the shutter solenoid 53, the throw of which operates the shutter. It will however be noted that the timing of this operation may be readily controlled by the needle valve 28.

Figure 5:
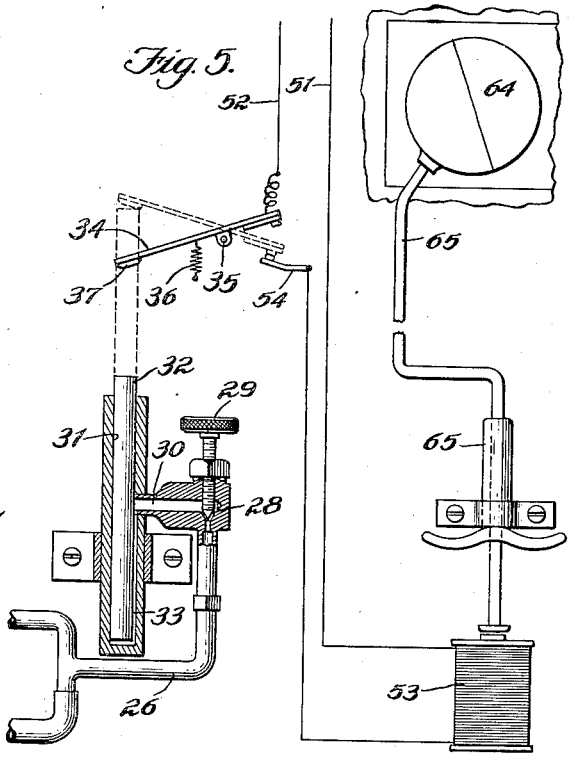
Figure 5 is a front view showing one means of using my apparatus with a wire or cable release shutter.

Other standard forms of cameras are provided with shutters operated by wire or cable release and I have shown in Figure 5 a method of operating these similar to that described in preceding paragraph except that the solenoid or devices 53 are incorporated in my apparatus and operate such wire or cable release 65 which has its actuating end mounted in the apparatus so that the throw of the solenoid gives the push to the wire release which operates the shutter 64. In this arrangement also valve 43 and connections are omitted, and plunger 32 on its upward travel closes the switch 54 and actuates the solenoid. Here also the timing of this operation may be readily controlled by the needle valve 28.

While I have shown a preferred method of accomplishing the delay between the stepping up or increasing of the brilliancy of the electric lamps and the operation of the camera shutter, it will be obvious that other methods may be utilized without departing from the scope of my invention and therefore I do not wish to be limited to the particular construction or devices herein shown and described except as specified in the following claims, in which I claim:

1. In a photographic apparatus, the combination with a camera shutter and its pneumatic device, of a bulb for actuating said device, a tube leading from said bulb, a branch from said tube, a pressure responsive element connected with said branch, an electric switch adapted to be actuated by said pressure responsive element, a light circuit controlled by said switch, a second branch from the tube beyond the first named branch, a control valve connected to said second named branch, a cylinder, an outlet from the valve to the cylinder, a piston in said cylinder, a normally closed valve connected with the end of said tube, means adapted to be actuated by the piston for opening said valve when the piston is raised and a connection from the last named valve to the shutter operating device.

2. In an apparatus of the character set forth, the combination of an air pressure bulb, a tube leading from said bulb, a branch from said tube, a bellows connected with said branch, a tilting frame mounted adjacent to the bellows and adapted to be actuated thereby, a spring tending to hold the frame in normal position, a mercury switch carried by said frame, a circuit adapted to be controlled by said switch, a second branch from said tube, a needle valve connected with said branch, a cylinder connected with the needle valve, a piston operatively mounted in said cylinder, a valve connected with the end of the tube, a spring tending to hold said valve in normally closed position, a pin slidably mounted above the valve, a pivoted lever engaging with the pin and adapted to be actuated by the piston to open said valve, and an outlet from the last named valve to the shutter operating device of a camera.

3. In a photographic apparatus, the combination of an air pressure device, a tube leading from said device, a bellows, a connection from the bellows to the tube, an abutment for engagement with one side of the bellows, a frame pivoted adjacent to the other side of the bellows, a finger on the bellows engaging with the frame and adapted to tilt the same when the bellows is extended, a spring tending to hold the frame in normal position, a mercury switch mounted in the frame, said switch being "open" in normal position, one or more electric lamps, a circuit from a source of supply to said lamps, a resistance arranged in said circuit, a shunt circuit around said resistance which includes the mercury switch, a controlling valve, a connection from said controlling valve to the tube, a cylinder connected with the controlling valve, a piston in said cylinder, a lever pivoted with one end lying within the path of the piston, a pin adapted to be actuated by said lever when the piston is raised, a normally closed valve connected with said tube, said valve being adapted to be opened by the pin, and a connection from the last named valve to a camera for actuating the shutter, the arrangement being such that when the air pressure device is actuated, the electric switch will first be closed and the shutter will then be operated at a predetermined time after the closure of said switch.

4. In a photographic apparatus the combination with a camera having a shutter operated by cable or wire release, of an electromagnet for operating said release, a pressure responsive element, means for operating said pressure responsive element, an electric switch adapted to be actuated by said pressure responsive element, light and electromagnet circuits controlled by said switch, and means adapted to be operated by said electromagnet when energized for operating the cable or wire release of the camera shutter.

5. In a photographic apparatus the combination with a camera shutter and its pneumatic device, of a bulb for actuating said device, a tube leading from said bulb, a branch from said tube, a pressure responsive element connected with said branch, an electric switch adapted to be actuated by said pressure responsive element, a light circuit and an electric time delay circuit controlled by said switch, a second branch from the tube beyond the first named branch, a normally closed valve connected with the end of said tube, an electro responsive device adapted to be actuated by the electric time delay circuit for opening said valve when this time delay action is completed after closure of this circuit, and a connection from this valve to the shutter operating device.

6. In an apparatus of the character set forth, the combination of an air pressure bulb, a tube leading from said bulb, a branch from said tube, a bellows connected with said branch, a tilting frame mounted adjacent to the bellows and adapted to be actuated thereby, a spring tending to hold the frame in normal position, a mercury switch for light circuit carried by said frame, two circuits adapted to be controlled by said switch, a needle valve connected with the end of said tube, a cylinder connected with the needle valve, a piston operatively mounted in said cylinder, a switch for an electromagnet circuit mounted above and actuated by said piston, an electromagnet controlled by said switch, and means for holding cable or wire release of camera shutter in proper position to be operated by the pull or push of said electromagnet.

7. The combination of an air pressure bulb, a pressure responsive device, a connection from said bulb to said device, a light controlling member adapted to be actuated by said pressure responsive device, a cylinder having a piston therein, a connection from the bulb to the cylinder, a control valve in said connection, a camera shutter having an operating device, and means actuated by said piston for operating the shutter actuating device.

HERBERT M. SMITH.